US007688857B2

(12) United States Patent
Jang et al.

(10) Patent No.: US 7,688,857 B2
(45) Date of Patent: Mar. 30, 2010

(54) DATA TRANSMISSION METHOD USING PACKET AGGREGATION

(75) Inventors: Kyung-Hun Jang, Suwon-si (KR); Dong-Jun Lee, Seoul (KR); Sung-Hyun Choi, Seoul (KR); Jin-Bong Chang, Daejeon (KR); Young-Soo Kim, Seoul (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 0 days.

(21) Appl. No.: 11/849,864

(22) Filed: Sep. 4, 2007

(65) Prior Publication Data
US 2007/0291793 A1 Dec. 20, 2007

Related U.S. Application Data

(63) Continuation of application No. 11/199,060, filed on Aug. 8, 2005.

(30) Foreign Application Priority Data

Aug. 7, 2004 (KR) ............................. 62252/2004

(51) Int. Cl.
*H04J 3/22* (2006.01)
(52) U.S. Cl. .................. 370/469; 370/329; 370/473
(58) Field of Classification Search ................ 370/278, 370/389, 462, 473; 709/223
See application file for complete search history.

(56) References Cited

U.S. PATENT DOCUMENTS

| 2002/0023080 A1 | 2/2002 | Uga et al. |
| 2003/0147385 A1 | 8/2003 | Montalvo et al. |
| 2003/0169769 A1 | 9/2003 | Ho et al. |
| 2004/0146067 A1* | 7/2004 | Yi et al. .................. 370/474 |
| 2005/0015703 A1* | 1/2005 | Terry et al. .................. 714/776 |

(Continued)

FOREIGN PATENT DOCUMENTS

EP    1 180 882    2/2002

(Continued)

OTHER PUBLICATIONS

Yang Xiao, "Concatenation and Piggyback Mechanisms for the IEEE 802.11 MAC", Wireless Cc and Networking Conference, Mar. 2004.

(Continued)

*Primary Examiner*—Derrick W Ferris
*Assistant Examiner*—Jose Villa
(74) *Attorney, Agent, or Firm*—NSIP Law

(57) ABSTRACT

In the data transmission method, a MAC layer receives data from an upper layer, classifies the data according to destination addresses and traffic identifiers, aggregates the data by destination address and traffic identifier as a first transmission unit, aggregates the first transmission units having the identical destination address as a second transmission unit, and transmits the second transmission units having different destination addresses in a single frame. The data transmission method allows packets transferred from the upper layer to be hierarchically aggregated by DAs and TIDs and then packaged into a data unit for each destination such that it is possible to transmit the data at an optimal data rate for each destination terminal.

8 Claims, 5 Drawing Sheets

U.S. PATENT DOCUMENTS

| | | | |
|---|---|---|---|
| 2005/0114489 A1* | 5/2005 | Yonge et al. | 709/223 |
| 2005/0152358 A1 | 7/2005 | Giesberts et al. | |
| 2005/0152359 A1* | 7/2005 | Giesberts et al. | 370/389 |
| 2005/0238016 A1 | 10/2005 | Nishibayashi et al. | |
| 2005/0249222 A1* | 11/2005 | van Kampen et al. | 370/395.5 |
| 2006/0018268 A1* | 1/2006 | Kakani et al. | 370/278 |
| 2006/0056443 A1* | 3/2006 | Tao et al. | 370/462 |

FOREIGN PATENT DOCUMENTS

| | | |
|---|---|---|
| EP | 1180882 | 2/2002 |
| EP | 1 589 704 | 10/2005 |
| EP | 1589704 | 10/2005 |

OTHER PUBLICATIONS

Yang Xiao: "Concatenation and piggyback mechanism for the IEEE 802.11 MAC," Wireless Communication s and Networking Conference, 2004. WCNC. 2004 IEEE Atlanta, GA, USA Mar. 21-25, 2004, Piscataway, NJ, USA, IEEE, vol. 3, Mar. 21, 2004, pp. 1642-1647.
European Search Report, 3 pages, dated Dec. 18, 2007 for Application No. EP 07 01 8632.

* cited by examiner

DATA TRANSMISSION METHOD USING PACKET AGGREGATION

PRIORITY

This application is a continuation of application Ser. No. 11/199,060, filed Aug. 8, 2005, and which claims priority to an application entitled "Data Transmission Method Using Packet Aggregation" filed in the Korean Intellectual Property Office on Aug. 7, 2004 and assigned Serial No. 2004-62252, the contents of which are incorporated herein by reference.

BACKGROUND OF THE INVENTION

1. Field of the Invention

The present invention relates to a wireless communication system, and more particularly to a data transmission method using packet aggregation in order to improve resource efficiency in a multi-carrier based wireless communication system.

2. Description of the Related Art

Generally, a communication system uses a hierarchical frame structure in order to efficiently transmit data of an upper layer. Specifically, a wireless communication standard such as an Institute of Electrical and Electronics Engineers (IEEE) 802.11 standard and an IEEE 802.16 standard has conducted research and development for frame aggregation in a Media Access Control (MAC) layer and a physical (PHY) layer in order to maximize the efficiency of radio resources.

FIG. 1 illustrates a general framing process in a wireless communication system. As illustrated in FIG. 1, a MAC layer receives a MAC Service Data Unit (MSDU) 110 and attaches a MAC header 111 to the MSDU 110, thereby constructing a MAC Protocol Data Unit (MPDU) 11. The MAC header 111 includes various information such as Source Addresses (SAs) and Destination Addresses (DAs). The MSDU 110 may be classified according to traffic characteristics and identified by Traffic Identifiers (TIDs). The MPDU 11 is a PHY Service Data Unit (PSDU) 120 and is transferred to a PHY layer. Then, a PHY header 121 is attached to the PSDU 120, so that a PHY Protocol Data Unit (PPDU) 12 is constructed.

The PHY header 121 includes parameters for determining a transmission scheme including a modulation and coding scheme, etc. Before the PPDU 130 is transmitted wirelessly, a preamble 131 including channel estimation and synchronization information is attached to the PPDU 130.

In the framing process as described above, a data aggregation method may include an MSDU aggregation method and an MPDU aggregation method.

FIG. 2 illustrates the conventional MSDU aggregation method, in which MSDUs 210, 220 and 230 having the same DA 1 and TID1 construct an MPDU 21, an MPDU 22 and an MPDU 23, respectively, together with each MAC header 215. In this process, two of the three MAC headers 215 are removed, so that resource efficiency can be improved. This scheme has a greater effect when traffic of a specific connection session is very bursty. However, for aggregation of the MSDUs 210, 220 and 230, buffering is required until a predetermined number of MSDUs are accumulated. Therefore, it is difficult to apply this scheme to real-time traffic because jitter and delay variation increase.

Further, this scheme can achieve a good effect when short packets are aggregated. However, because an MPDU generally has a maximum length within 2000 to 3000 bytes, this scheme has reduced performance when long packets are aggregated.

FIG. 3 illustrates the conventional MPDU aggregation method. In which, DAs 315, 325 and 335 and TIDs 310, 320 and 330 are different from each other, but MPDUs 31, 32 and 33 having various DAs can construct and transmit one PPDU 130. Accordingly, the MPDU aggregation method is mainly effective in an Access Point (AP). In the MPDU aggregation method, because transmittable MPDUs are aggregated regardless of DAs and TIDs the instant a transmission opportunity is obtained, it does not influence jitter and delay time.

However, because it is not possible to load information regarding a modulation scheme and a transmission scheme for all receive terminals into one PHY header, it is necessary to set the transmission rates of the receive terminals to be the same, particularly, the transmission rate of a terminal having the worst channel conditions from among the receive terminals, even though the channel conditions of the receive terminals are not identical. Therefore, the waste of resources may be great.

Further, because all terminals must receive not only their own MPDUs but also MPDUs for terminals having different destinations, resources may be wasted. In addition, because all terminals must refer to the headers of all MPDUs in order to identify MPDUs targeting themselves, a processing delay may increase.

SUMMARY OF THE INVENTION

Accordingly, the present invention has been made to solve the above-mentioned problems occurring in the prior art, and it is an object of the present invention to provide a data transmission method using packet aggregation, in which packets transferred from an upper layer are hierarchically aggregated according to DAs and TIDs, and aggregated as a data unit according to each destination before being transmitted, so that data transmission can be performed at an optimal transmission rate for a destination terminal.

It is another object of the present invention to provide a data transmission method using packet aggregation, in which data are transmitted at an optimal transmission rate according to each terminal, so that it is possible to improve the reliability of a real-time traffic service sensitive to a delay.

It is further another object of the present invention to provide a data transmission method using packet aggregation, which can not only improve the resource efficiency by aggregating packets having the same DA or TID, attaching one MAC header shared by the packets to the aggregated packet, and transmitting the aggregated packet, but also improve the total system performance by transmitting data at an optimal transmission rate for each terminal.

In order to accomplish the aforementioned objects, according to one aspect of the present, there is provided a data transmission method using packet aggregation, the method including receiving data from an upper layer; classifying the data according to destination addresses and traffic identifiers; aggregating data having the same destination address and the same traffic identifier as a first transmission unit; aggregating the first transmission unit having the same destination address as a second transmission unit; and transmitting one frame including the second transmission unit which has different destination addresses.

Preferably, the first transmission unit includes one Media Access Control (MAC) header having information for the destination address and the traffic identifier, and the second transmission unit includes one physical (PHY) header having the destination address.

The frame includes a frame header having information for a modulation scheme and a transmission scheme. Preferably, the data includes a MAC Service Data Unit (MSDU), the first transmission unit includes a MAC Protocol Data Unit (MPDU), and the second transmission unit includes a PHY Protocol Data Unit (PPDU).

In order to accomplish the aforementioned objects, according to another aspect of the present, there is provided a data transmission method using packet aggregation, the method including receiving Media Access Control (MAC) Service Data Unit (MSDUS) including various destination addresses and traffic identifiers from an upper layer; classifying the MSDUs according to each destination address; classifying the MSDUs, which have been classified according to each destination address, according to each traffic identifier; aggregating MSDUs having the same destination address and the same traffic identifier as a MAC Protocol Data Unit (MPDU); aggregating MPDUs having the same destination address from among the MPDUs as a physical (PHY) Protocol Data Unit (PPDU); and transmitting one frame including PPDUs which have different destination addresses.

Preferably, the MPDU includes one MAC header for indicating the destination address and the traffic identifier, the PPDU includes one PHY header for indicating the destination address, and the frame includes a frame header having information for a modulation scheme and a transmission scheme.

A data transmission method in a wireless communication system, includes classifying data received from an upper layer according to destination addresses; aggregating data having a same destination address and a same traffic identifier; attaching a header to the aggregated data to form a first transmission unit; and aggregating at least two first transmission units having a same destination address as a second transmission unit.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a hierarchical packet aggregation method according to a preferred embodiment of the present invention will be described with reference to the accompanying drawings.

The hierarchical packet aggregation method of the present invention performs a MAC Service Data Unit (MSDU) aggregation or a MAC Protocol Data Unit (MPDU) aggregation according to each receive terminal, constructs PHY Service Data Units (PSDUs), and attaches a PHY header having transmission scheme-related information appropriate for each receive terminal according to each PSDU, thereby constructing PHY Protocol Data Units (PPDUs). The PPDUs constructed in this way are mapped to one radio frame, a frame header is attached to the radio frame, and then the radio frame is transmitted.

Figure 1:
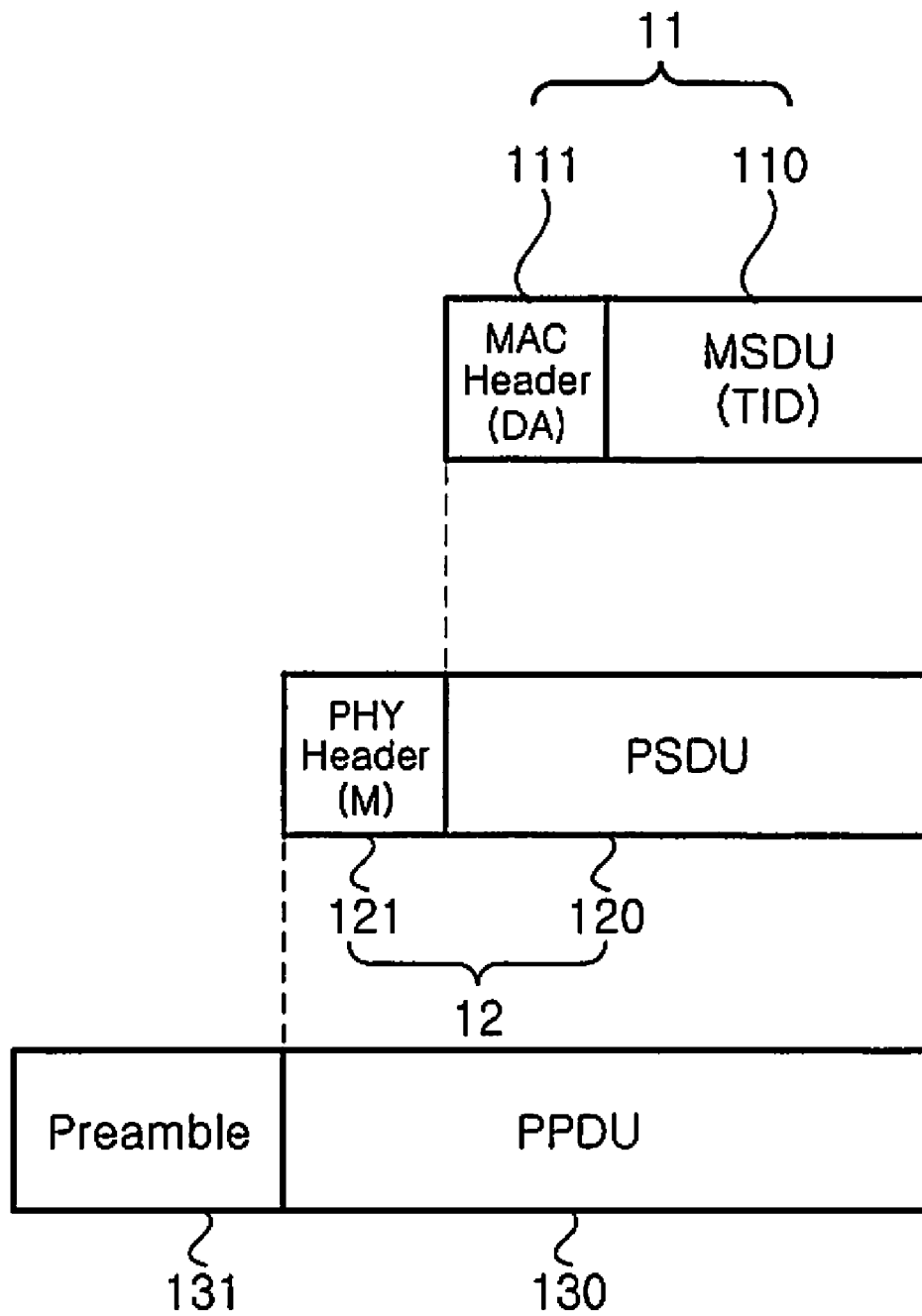
FIG. 1 illustrates a general framing process in a wireless communication system.
Figure 2:
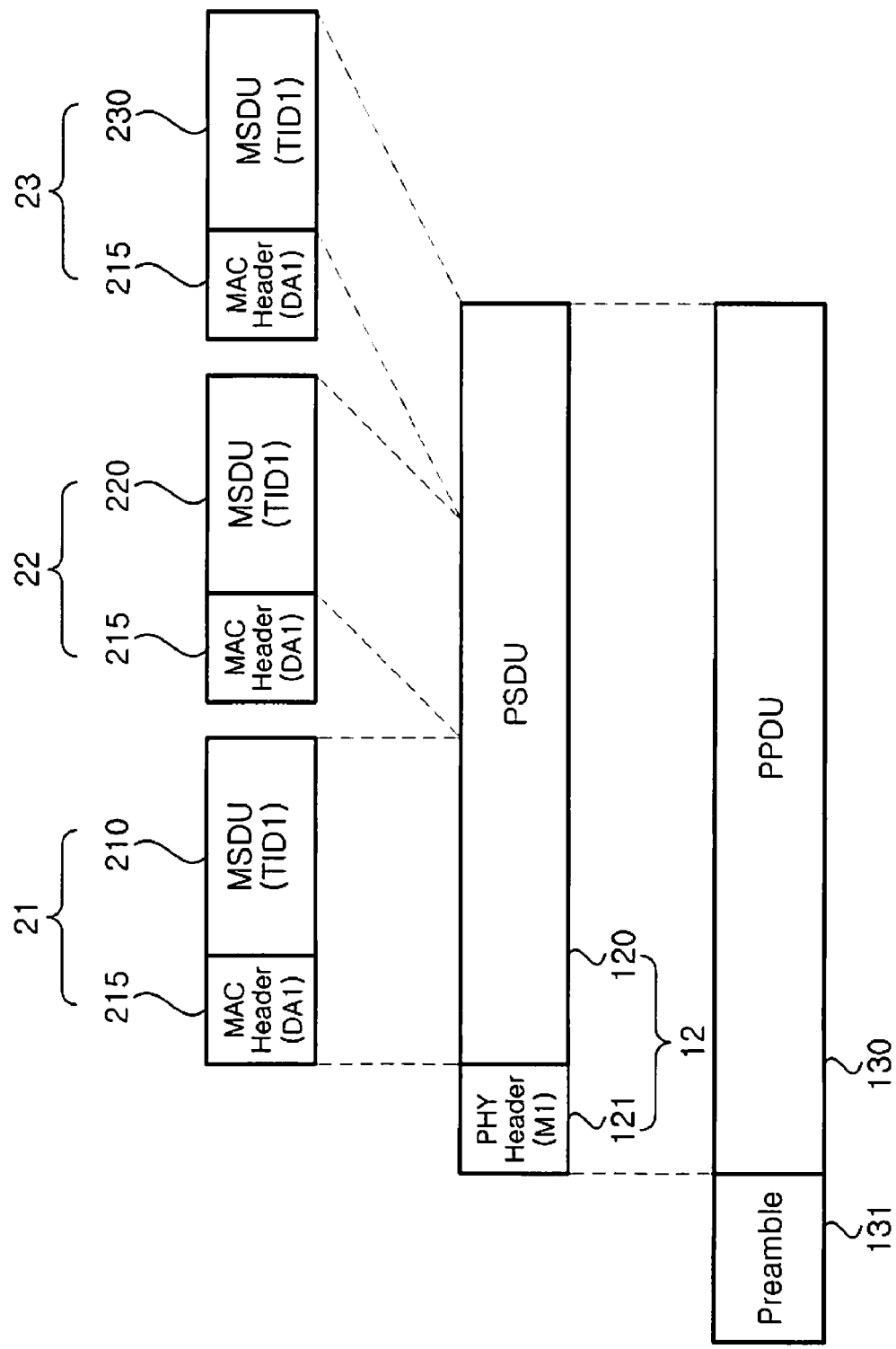
FIG. 2 illustrates a conventional MSDU aggregation method.
Figure 3:
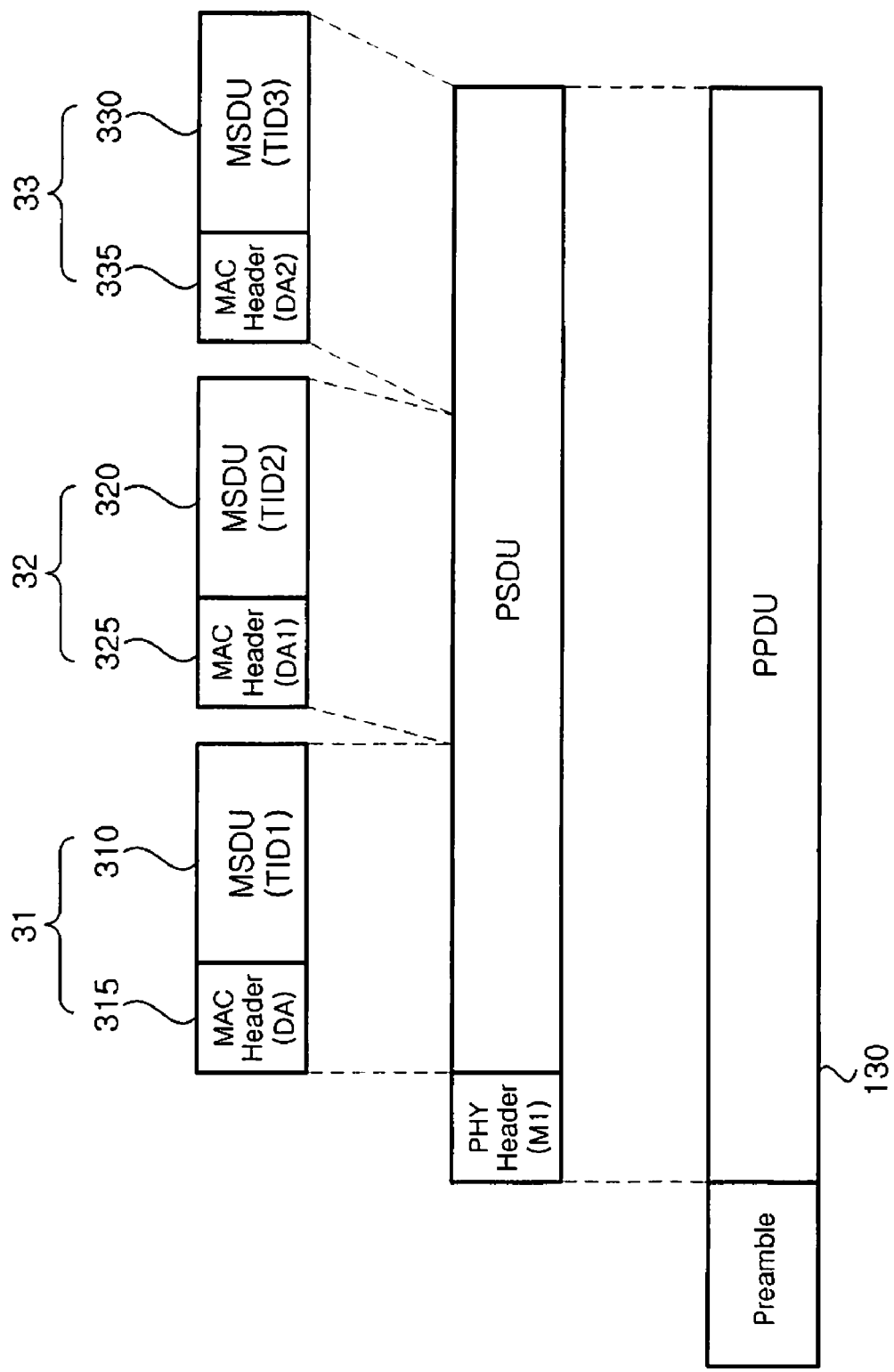
FIG. 3 illustrates a conventional MPDU aggregation method.
Figure 4:
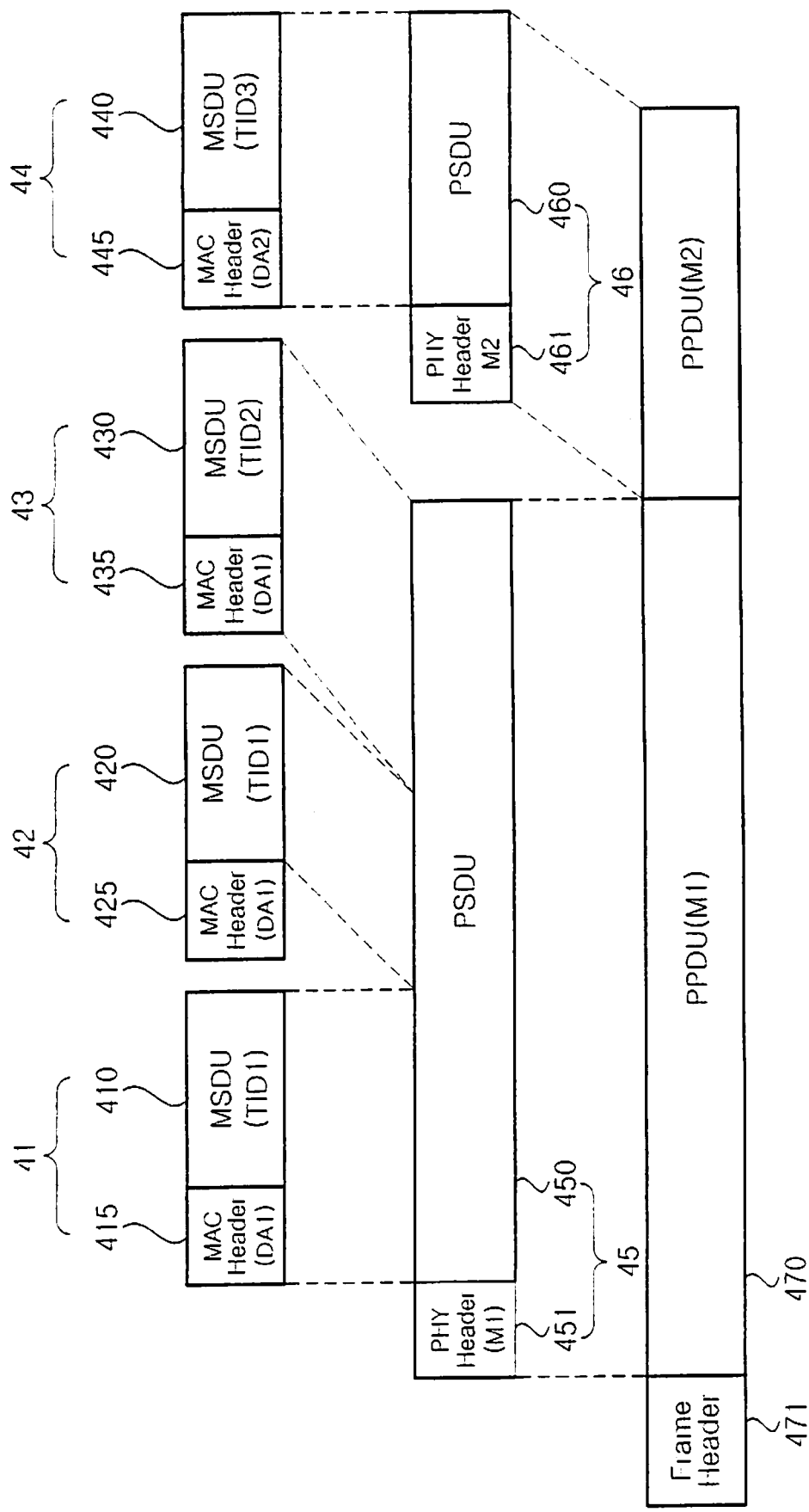
FIG. 4 is a diagram illustrates a hierarchical packet aggregation method according to a preferred embodiment of the present invention.

FIG. 4 illustrates the hierarchical packet aggregation method according to a preferred embodiment of the present invention, which is an exemplary case in which four MSDUs are transferred from an upper layer, for convenience of description.

Referring to FIG. 4, in a MAC layer, MAC headers are attached to the MSDUs 410, 420, 430 and 440, which have been transferred from the upper layer, according to receive terminals to which the MSDUs are to be transmitted, so that MPDUs are generated. That is, MAC headers 415, 425 and 435 having the same Destination Address 1 (DA1) are attached to the MSDUs 410, 420 and 430 to be transmitted to a terminal #1, and a MAC header 445 having a DA2 is attached to the MSDU 440 to be transmitted to a terminal #2, so that corresponding MPDUs 41 to 44 are constructed.

The MSDUs 410, 420, 430 and 440 may be classified according to traffic types of the upper layer and identified by Traffic Identifiers (TIDs). The MAC header includes a type field for indicating the traffic types of the upper layer, so that it provides information for TIDs of aggregated MSDUs.

From among the MPDUs 41 to 44 constructed in this way, the MPDUs 41 to 43 having the same DA1 in the MAC header 415 to 435, respectively, are aggregated as a PSDU 450 of a predetermined length, and the MPDU 44 having the DA2 in the MAC header 445 is aggregated as a PSDU 460 of a predetermined length. Then, PHY headers 451 and 461 including information regarding a modulation scheme and a transmission scheme for a corresponding terminal are attached to the PSDU 450 and 460, respectively, so that PPDUs 45 and 46 are constructed.

In the aggregation process of the MPDUs including the MAC headers, which have the same DA, and the same TID, only one common MAC header remains and the other MAC header is removed. Accordingly, in FIG. 4, the MPDUs 41 and 42 having the same TID are mapped to the PPDU 45 together with said one common MAC header, and the MPDU 43 having a different TID is mapped to the PPDU 45 together with its own MAC header 435. If there is a situation in which MPDUs having the same DA and TID as those of the MPDU 43 must be mapped to the PPDU 45, it is preferred that the other MPDUs are mapped without MAC headers, i.e., in a state of the MSDU.

The PPDUs 45 and 46 constructed in this way are mapped to a radio frame 470 of a predetermined length. Preferably, Each PPDU has a modulation and transmission scheme index (M1, M2). Then, a frame header 471 is attached to the radio frame 470 and the radio frame 470 is transmitted.

In this case, the MPDUs having the same DA are aggregated, i.e., data are aggregated according to each terminal, so that overlapping MAC headers can be reduced and corresponding MPDUs can be transmitted at an optimal transmission rate for each terminal.

Figure 5:
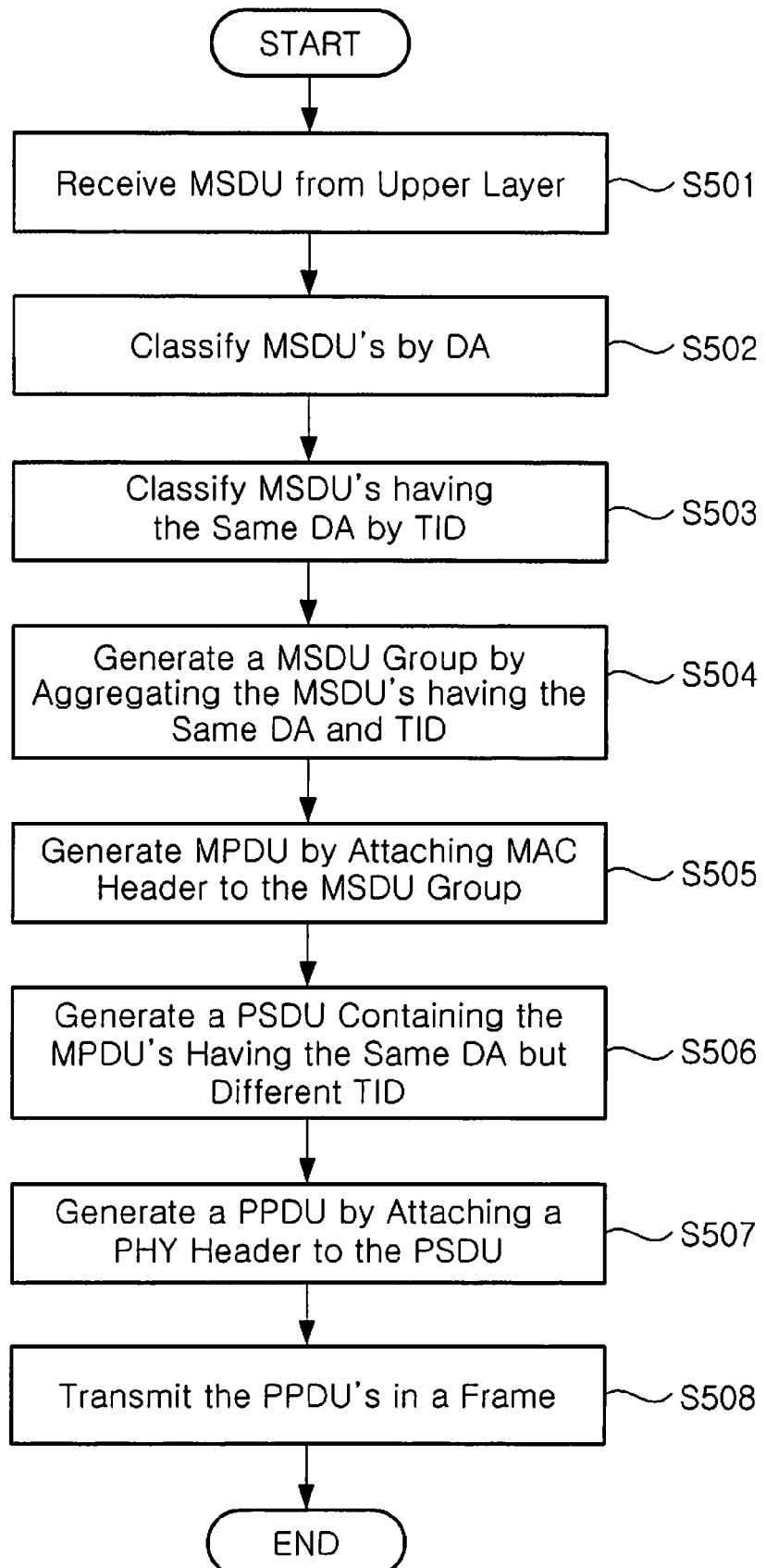
FIG. 5 is a flow diagram illustrating a hierarchical packet aggregation method according to a preferred embodiment of the present invention.

FIG. 5 is a flow diagram illustrating the hierarchical packet aggregation method according to a preferred embodiment of the present invention. In FIG. 5, when MSDUs are received from an upper layer (step S501), a MAC layer checks the DAs and the TIDs of the MSDUs and classifies the MSDUs according to each DA (step S502). When the classification for the MSDUs according to each DA has ended, MSDUs having the same TID are classified from among MSDUs having the same DA (step S503). The MSDUs having the same DA and TID are aggregated, so that an MSDU group is generated (step S504). Further, one MAC header is attached to the MSDU group constructed in this way, so that an MPDU is generated (step S505). The MAC header includes information for types of the same DA and TID. In other words, the MSDUs having the same DA and TID are aggregated, so that one MPDU is generated. A PSDU is then generated which contains MPDU's having the same DA but a different TID (step S506). Then, a PHY header is attached to the MPDUs having the same DA and constructed in this way, so that a PPDU is generated (step S507). Further, PPDUs having different DAs are loaded into one radio frame and transmitted together with a frame header (step S508).

According to a data transmission method using packet aggregation of the present invention as described above, packets transferred from an upper layer are hierarchically aggregated according to DAs and TIDs, and aggregated as a data unit according to each destination before being transmitted, so that data transmission can be performed at an optimal transmission rate for a destination terminal, to improve the quality of a real-time traffic service sensitive to a delay.

Furthermore, according to a data transmission method using packet aggregation of the present invention, packets having the same DA or TID are aggregated, one MAC header shared by the packets is attached to the aggregated packet, and then the aggregated packet is transmitted, so that resource efficiency can be improved. In addition, data transmission is performed at an optimal transmission rate for each terminal, so that the total system performance can be improved.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A data transmission apparatus in a wireless communication system, comprising: means for aggregating MAC (Media Access Control) Service Data Units (MSDUs) received from an upper layer having a same destination address and a same traffic identifier to form a first aggregate data unit; means for forming a MAC Protocol Data Unit (MPDU) by attaching a header to the first aggregate data unit; and means for aggregating the MPDU including the first aggregate data unit with another MPDU having the same destination address to form a second aggregate data unit, wherein the second aggregate data unit is transmitted via a Physical Protocol Data Unit (PPDU).

2. The data transmission apparatus as claimed in claim 1, wherein the header is a Media Access Control (MAC) header.

3. The data transmission apparatus as claimed in claim 2, wherein the MAC header includes the destination address of the aggregated data.

4. The data transmission apparatus as claimed in claim 1, wherein the MPDU and the another MPDU included in the second aggregate data unit have different traffic identifiers.

5. A data transmission method in a wireless communication system, the method comprising: aggregating at a data transmission apparatus MAC (Media Access Control) Service Data Units (MSDUs) received from an upper layer having a same destination address and a same traffic identifier to form a first aggregate data unit; forming a MAC Protocol Data Unit (MPDU) by attaching a header to the first aggregate data unit; and aggregating the MPDU including the first aggregate data unit with another MPDU having the same destination address to form a second aggregate data unit, wherein the second aggregate data unit is transmitted via a Physical Protocol Data Unit (PPDU).

6. The data transmission method as claimed in claim 5, wherein the header is a Media Access Control (MAC) header.

7. The data transmission method as claimed in claim 6, wherein the MAC header includes the destination address of the aggregated data.

8. The data transmission method as claimed in claim 5, wherein the MPDU and the another MPDU included in the second aggregate data unit have different traffic identifiers.

* * * * *